United States Patent [19]

Malloy Desormeaux

[11] Patent Number: 4,653,886
[45] Date of Patent: Mar. 31, 1987

[54] FILM-ON-SPOOL SENSOR FOR PREVENTING INITIALIZATION OF FRAME COUNTER

[75] Inventor: Stephen G. Malloy Desormeaux, Rochester, N.Y.

[73] Assignee: Eastman Kodak Company, Rochester, N.Y.

[21] Appl. No.: 829,748

[22] Filed: Feb. 18, 1986

[51] Int. Cl.⁴ .............................................. G03B 17/36
[52] U.S. Cl. .................................... 354/214; 354/217
[58] Field of Search .............. 354/212, 213, 214, 215, 354/217, 218, 173.1, 173.11

[56] References Cited

U.S. PATENT DOCUMENTS

| | | | |
|---|---|---|---|
| 3,511,153 | 5/1970 | Steisslinger et al. | 354/213 |
| 3,925,798 | 12/1975 | Sanada et al. | 354/215 |
| 4,281,911 | 8/1981 | Engelsman et al. | 354/173.1 |
| 4,362,370 | 12/1982 | Iwata et al. | 354/217 |
| 4,416,525 | 11/1983 | Chan | 354/173 |
| 4,494,842 | 1/1985 | Kimura et al. | 354/173.11 |

Primary Examiner—A. A. Mathews
Attorney, Agent, or Firm—Roger A. Fields

[57] ABSTRACT

In a photographic camera, a frame counter operates during movement of a filmstrip from a film cartridge onto a take-up spool or back into the cartridge to count exposed or unexposed frames on the filmstrip. An initializing mechanism responsive to the opening of a rear door to remove the cartridge from the camera initializes the counter to an empty setting. If however the door is accidentally or inadvertently opened with the filmstrip in midroll, a film-on-spool sensor sensing the presence of the filmstrip on the take-up spool prevents the initializing mechanism from initializing the counter. This allows the counter to continue its frame count after the door is re-closed should the photographer wish to salvage any unexposed frames.

6 Claims, 3 Drawing Figures

FILM-ON-SPOOL SENSOR FOR PREVENTING INITIALIZATION OF FRAME COUNTER

BACKGROUND OF THE INVENTION

1. Field of the Invention

The invention relates generally to photographic cameras and in particular to those cameras which have a frame counter for indicating the number of frames exposed or remaining to be exposed on a filmstrip in the camera.

2. Description of the Prior Art

Typically in many recent 35 mm cameras, there is included a motorized film transport mechanism. In operation, a leading end portion of the filmstrip extending from a light-tight cartridge loaded in the camera is attached automatically to a take-up spool. The take-up spool is rotated automatically after each exposure to advance successive frames of the filmstrip from the cartridge across the focal plane of a taking lens and onto the take-up spool. Each time the take-up spool is rotated, an unexposed frame on the filmstrip is located in the focal plane of the taking lens and the exposed frame is wound onto the take-up spool. When the fresh film supply has been exhausted, a trailing end portion of the filmstrip remains attached to a dispensing spool within the cartridge. The end of film condition is signalled by a sudden rise in the film tension as the take-up spool attempts to withdraw the remainder of the filmstrip from the cartridge. A tension sensing mechanism responds to this increase in film tension by reversing the motor drive to rotate the dispensing spool. The rotated spool draws the filmstrip off the take-up spool and rewinds it into the cartridge. Then, a rear door of the camera is opened and the cartridge is removed in order to process the filmstrip.

Opening the rear door of the camera to remove the cartridge initializes a frame counter to an empty setting. When a cartridge with a fresh filmstrip is loaded in the camera, the counter is incremented from its empty setting to a "1" setting in response to advance of the filmstrip to locate its first frame in the focal plane of the taking lens. Failure to initialize the counter would result in the frame count being out of synchronization with the exposed frames on the filmstrip.

If the rear door of the camera is accidentally or inadvertently opened before the filmstrip is completely exposed or before it is substantially rewound back into the cartridge, the exposed frames on at least the outermost convolution of the filmstrip on the take-up spool will be ruined. To prevent this occurance, cameras have been recently provided with a motorized transport mechanism which pre-winds the filmstrip onto the take-up spool before any exposures are taken. Then, after each exposure the filmstrip is rewound incrementally into the cartridge. Thus the exposed frames will be protected within the cartridge should the rear door be opened prematurely.

A frame counter in a camera that pre-winds a fresh filmstrip onto the take-up spool and rewinds the filmstrip incrementally into the cartridge after each exposure is driven by film movement in both the pre-wind and rewind directions. When the filmstrip is moved in the pre-wind direction, the counter is incremented to indicate the maximum number of available exposures. Conversely, movement of the filmstrip in the rewind direction decrements the counter after each exposure to indicate the remaining number of available exposures. Opening the rear door of the camera accidentally or inadvertently before the filmstrip is completely wound off the take-up spool will initialize the counter to its empty setting. This may be considered undesireable because the counter cannot continue its frame count after the door is re-closed should the photographer wish to salvage any unexposed portion of the filmstrip beneath the outermost convolution on the take-up spool.

It has been suggested in commonly assigned U.S. Pat. No. 3,511,153, granted May 12, 1970, that a frame counter not be initialized to its empty setting in the event the rear door of the camera is opened before the filmstrip is completely rewound into the cartridge. Specifically, rotation of the counter to increment or decrement the counter is prevented by arresting a metering sprocket in a predetermined angular position. The metering sprocket is connected to the counter and has teeth engagable with successive perforations in the filmstrip to rotate the sprocket and the counter during film movement. However, with this arrangement, the counter cannot be initialized except by rotating the counter manually to its empty setting.

SUMMARY OF THE INVENTION

The above-described problems regarding frame counters in photographic cameras are believed to be solved by the invention. According to the invention, a frame counter operates in a camera during movement of a filmstrip from a film cartridge onto a take-up spool or back into the cartridge to provide a count of exposed or unexposed frames on the filmstrip. An initializing mechanism responsive to the opening of a door to remove the cartridge from the camera initializes the counter to an empty setting. If however the door is accidentally or inadvertently opened with the filmstrip in midroll, a film-on-spool sensor sensing the presence of the filmstrip on the take-up spool prevents the initializing mechanism from initializing the counter. This allows the counter to continue its frame count after the door is re-closed should the photographer wish to salvage any unexposed frames.

BRIEF DESCRIPTION OF THE DRAWINGS

The invention will be described in connection with the drawings, wherein.

DESCRIPTION OF THE PREFERRED EMBODIMENT

Figure 1:
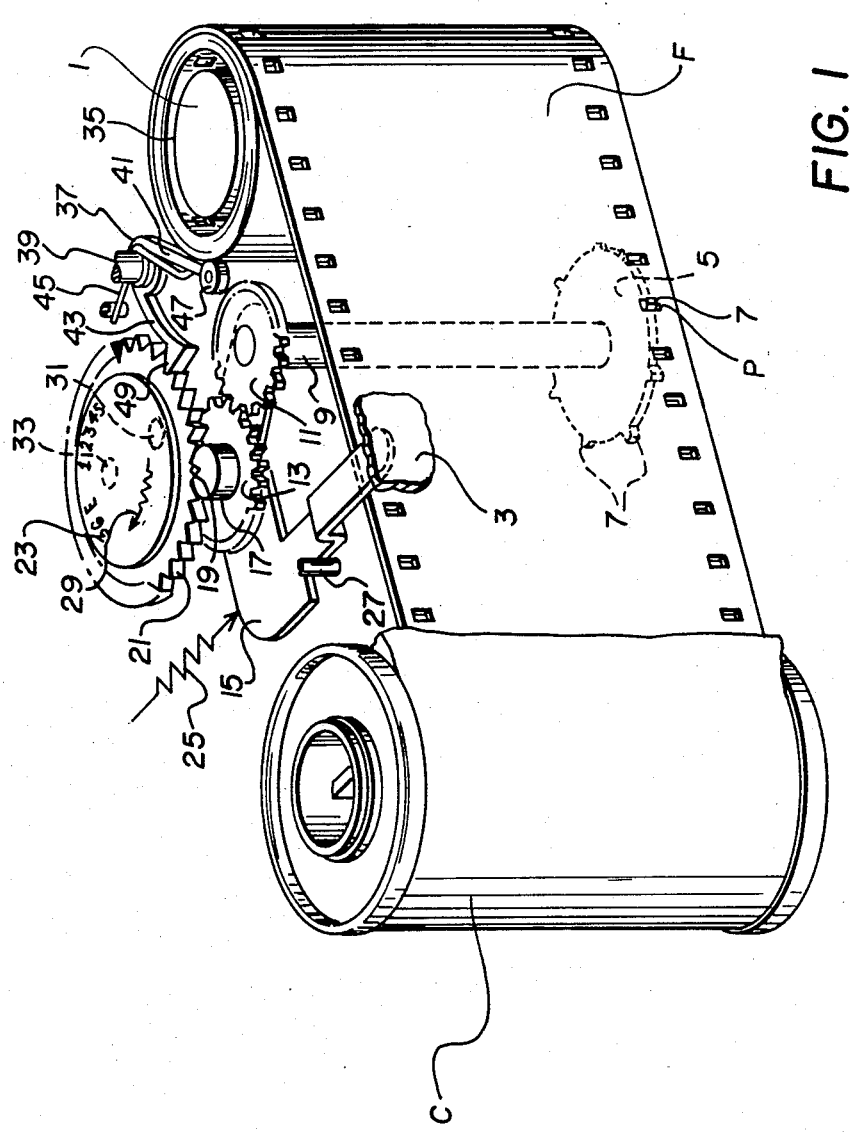
FIG. 1 is a perspective view of camera apparatus including a frame counter for counting exposed or unexposed frames on a filmstrip and a film-on-spool sensor for preventing initialization of the counter whenever the filmstrip is wound on a take-up spool, in accordance with a preferred embodiment of the invention.

The invention is disclosed as being embodied preferably in a 35 mm camera. Because the features of this type camera are well known, the description which follows is directed in particular to photographic elements forming part of or cooperating directly with the disclosed embodiment. It is to be understood however that other elements not specifically shown or described may take various forms known to persons of ordinary skill in the art.

In the type of camera to be described those photographic elements shown in the drawings will be assigned successive reference numbers. Other photographic elements not shown in the drawings are well known or conventional and will not be assigned any reference numbers. Thus, in the description which follows, the absence of a reference number in connection with a mentioned element indicates that such element is not shown in the drawings.

Referring now to the drawings and in particular to FIG. 1, there is shown certain elements of a 35 mm camera of the type in which a motorized film transport mechanism pre-winds substantially the entire length of a filmstrip F from a light-tight film cartridge C onto a take-up spool or drum 1 before any exposures are taken. Then, after each exposure the filmstrip F is rewound one frame at a time into the cartridge C. This is done to protect the exposed frames on the filmstrip F within the cartridge C in the event a rear door 3 of the camera is accidentally or inadvertently opened prematurely, i.e. before the filmstrip is rewound completely into the cartridge.

Figure 2:
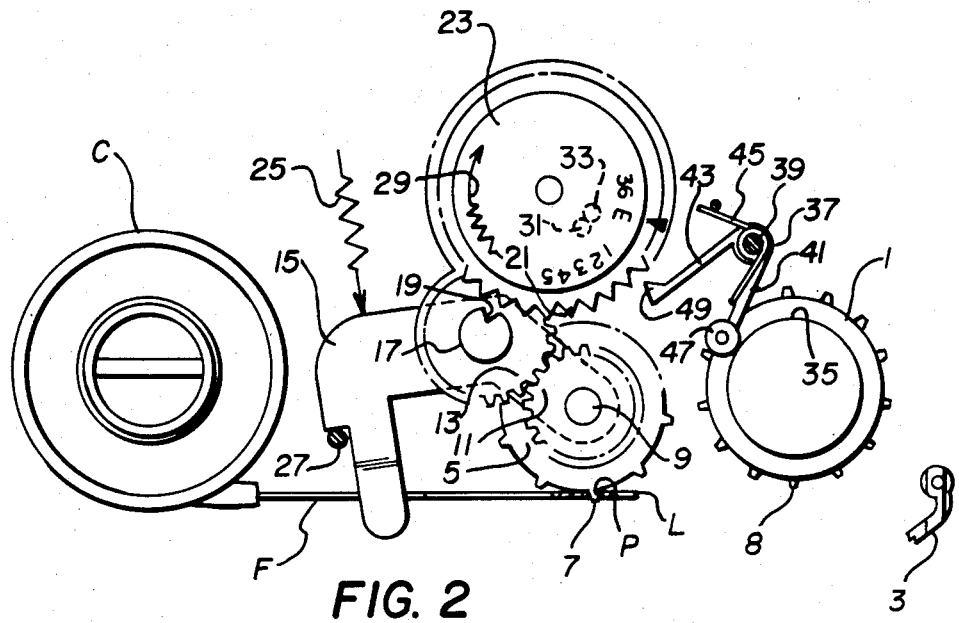
FIG. 2 is a top plan view of the counter and the sensor, showing their relative positions in the absence of a filmstrip on the take-up spool.

When the cartridge C is loaded in the camera, as shown in FIG. 2, a leading end portion L of the filmstrip F is placed over a metering sprocket 5 to position one or more perforations P in the leading end portion in engagement with respective teeth 7 on the sprocket. Closing the rear door 3 actuates the motorized film transport mechanism to rotate the metering sprocket 5 in order to advance the leading end portion L of the filmstrip F onto the take-up spool 1. The take-up spool 1 has respective teeth 8 for engaging successive perforations in the leading end portion of the filmstrip F and is rotated by the motorized transport mechanism at a faster speed than the metering sprocket 5. A film tension responsive clutch de-couples the metering sprocket 5 from its rotational drive in response to the resulting pull on the filmstrip F caused by engagement of the leading end portion of the filmstrip to the faster rotating spool 1. thereafter, the metering sprocket 5 operates in an idling capacity, that is, it is rotated by movement of the filmstrip F from the cartridge C onto the take-up spool 1. Even though a substantial length of the filmstrip F has been pre-wound onto the take-up spool 1, a trailing end portion of the filmstrip will remain attached to a dispensing spool within the cartridge C. The end of film condition during pre-winding is signalled by a sudden increase in film tension as the take-up spool 1 attempts to withdraw the reminder of the filmstrip from the cartridge. A tension sensing member responds to this increase in film tension by reversing the motorized transport mechanism to reverse rotation of the take-up spool 1. The reversed transport mechanism pivots a gear or the like into driving relation with a rotation hub which engages the dispensing spool within the cartridge C. Then, after each exposure of a frame on the filmstrip F, the dispensing spool is rotated by the hub a sufficient angle to rewind the exposed frame into the cartridge C. At the same time, the take-up spool 1 is rotated to advance a fresh frame off the take-up spool.

During rewind movement of the filmstrip F from the take-up spool 1 into the cartridge C, the metering sprocket 5 governs the termination of film movement between successive frames on the filmstrip. After being rotated a single revolution by rewind movement of the filmstrip F, the metering sprocket 5 closes a metering switch to discontinue film movement. Film movement is resumed each time a shutter actuating button is released by the photographer.

As shown in FIG. 1, a coaxial shaft 9 connects the metering sprocket 5 and a gear 11 to enable the sprocket and the gear to rotate in unison. The gear 11 engages a gear 13 rotatably mounted on a swing plate 15. The swing plate 15 is supported on the shaft 9 for pivotal movement about the shaft without disengaging the gear 13 from the gear 11. A motion-transmitting member 17 is coaxially mounted atop the gear 13 and has a single recess 19 for receiving respective teeth 21 on a counter disk 23.

The counter disk 23 is rotatably mounted on the body of the camera. When the rear door 3 is closed, it abuts against the swing plate 15 to maintain the motion-transmitting member 17 in engagement with the counter disk 23 at the teeth 21. The counter disk 23 has thirty-six evenly spaced settings represented by the numbers "1, 2, 3, 4, 5, . . . 36" imprinted on the disk. These numbers correspond to successive frames on the filmstrip F. An empty setting of the counter disk 23 is represented by the letter "E" imprinted on the disk. This is to indicate that the camera is empty.

When the cartridge C is loaded in the camera and the filmstrip F is pre-wound onto the take-up spool 1, the metering sprocket 5 is rotated by pre-winding movement of the filmstrip to increment the counter disk 23 from its "E" setting to a maximum number setting, such as the "36" setting, to indicate the maximum number of unexposed frames on the filmstrip F. Conversely, as the filmstrip F is rewound into the cartridge C after each exposure, the metering sprocket 5 is rotated by rewinding movement of the filmstrip to decrement the counter disk 23 one setting at a time from its maximum number setting to indicate the remaining number of unexposed frames on the filmstrip. In operation, the metering sprocket 5, the gears 11 and 13, and the motion-transmitting member 17 are each rotated one revolution between successive frames.

When the rear door 3 is opened, as shown in FIG. 2, a separating spring 25 urges the swing plate 15 to pivot outwardly about the shaft 9 into abutment against a stop pin 27, causing the motion-transmitting member 17 to slightly separate from the counter disk 23 and thereby disengage the disk. This allows an initializing spring 29 to rotate the counter disk 23 to decrement the disk to its "E" setting. A stop in 31 on the underside of the counter disk 23 contacts a fixed pin 33 on the body of the camera to halt the counter disk 23 at its "E" setting.

Figure 3:
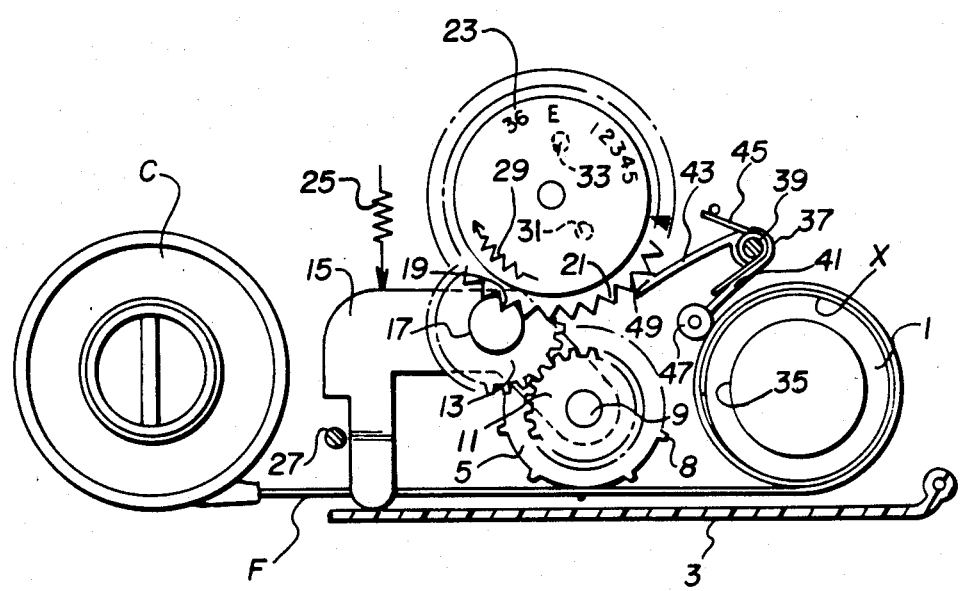
FIG. 3 is a top plan view of the counter and the sensor, showing their relative positions with a filmstrip present on the take-up spool.

The take-up spool 1 includes a relieved annular portion 35 on its periphery having a smaller diameter than the remainder of the take-up spool. A film-on-spool sensor 37 is pivotally mounted on the body of the camera by a pivot pin 39 and includes a sensing member 41 and an engaging member 43. The sensing member 41 and the engaging member 43 are resiliently flexible and they may be integrally formed. A return spring 45 urges the film-on-spool sensor 37 to normally position a roller 47 on a free end of the sensing member 41 in abutment against the relieved annular portion 35 of the take-up spool 1, as shown in FIG. 2. When the filmstrip F is initially wound onto the take-up spool 1, a longitudinal section X of the first convolution of the filmstrip will be spaced opposite the relieved annular portion 35. See FIG. 3. The roller 47 will ride on the longitudinal section X, thereby being separated from the relieved annular portion 35. This will cause the film-on-spool sensor 37 to swing in a clockwise direction about the pivot pin 39 until a tooth 49 on a free end of the engaging member 43 moves against one of the teeth 21 on the counter disk 23. Since the engaging member 43 is resiliently flexible, it will not hinder rotation of the counter disk 23 by the metering sprocket 5.

If the rear door 3 is accidentally or inadvertently opened before the filmstrip F is completely rewound off the take-up spool 1, engagement of the tooth 49 of the film-on-spool sensor 37 with one of the teeth 21 on the counter disk 21 will prevent the initializing spring 29 from rotating the counter disk 23 after the motion-transmitting member 17 disengages the disk. Thus, the counter disk 23 will be maintained in place at its numbered setting and the frame count may be continued after the rear door 3 is re-closed. This allows the photographer to readily salvage any unexposed portion of the filmstrip F remaining on the take-up spool 1.

The invention has been described with reference to a preferred embodiment. However, it will be appreciated that variations and modifications can be effected within the ordinary skill in the art without departing from the scope of the invention. For example, an electrically operated frame counter, such as a liquid crystal display or a light-emitting diode display, may be used in a place of a mechanical counter. Moreover, a separate sprocket having teeth engagable with successive perforations in the filmstrip may be used in place of the metering sprocket 5 to rotate the counter disk 23.

I claim:

1. An improved photographic camera of the type wherein (a) a frame counter operates during movement of a filmstrip from a film cartridge onto a take-up spool or back into the cartridge to provide a count of exposed or unexposed frames on the filmstrip, (b) a door is openable to load and remove the cartridge into and from said camera, and (c) means responsive to the opening of said door. initializes said counter, and wherein the improvement comprises:

means for sensing the presence of a filmstrip on said take-up spool; and means operating in association with said sensing means responsive to the presence of a filmstrip on said take-up spool for preventing said initializing means from initializing said counter in the event said door is opened, whereby said counter can continue its operation after said door is re-closed should a photographer wish to salvage any unexposed frames on the filmstrip.

2. An improved photographic camera of the type wherein (a) a sprocket having teeth engagable with successive perforations in a filmstrip is rotated by movement of the filmstrip from a film cartridge onto a take-up spool and back into the cartridge, (b) a frame counter responsive to rotation of said sprocket provides a count of the number of frames exposed or remaining on the filmstrip, (c) a door is openable to load and remove the cartridge into and from said camera, and (d) means responsive to the opening of said door initializes said counter, and wherein the improvement comprises:

means for sensing the presence of a filmstrip on said take-up spool; and means connected with said sensing means for movement responsive to the presence of a filmstrip on said take-up spool for preventing said initializing means from initializing said counter in the event said door is opened, whereby said counter can continue a frame count in response to rotation of said sprocket after said door is re-closed.

3. An improved photographic camera of the type wherein (a) a sprocket having teeth engagable with successive perforations in a filmstrip is rotated by movement of the filmstrip from a film cartridge onto a take-up spool and back into the cartridge, (b) a frame counter responsive to rotation of said sprocket is rotated from an empty setting to provide a count of the number of frames exposed or remaining on the filmstrip, (c) a door is openable to load and remove the cartridge into and from said camera, and (d) initializing means responsive to the opening of said door rotates said counter back to its empty setting, and wherein the improvement comprises:

means for sensing the presence of at least one convolution of a filmstrip on said take-up spool; and means connected with said sensing means for movement responsive to the presence of at least one convolution of a filmstrip on said take-up spool for engaging said counter to prevent the counter from being rotated by said initializing means, though permitting said counter to be rotated by said sprocket, whereby said initializing means will be rendered ineffective in the event said door is opened with at least one convolution of the filmstrip on said take-up spool.

4. The improvement as recited in claim 3, wherein said take-up spool includes a relieved annular portion on its periphery having a smaller diameter than the remainder of the spool to locate a longitudinal section of a first convolution of a filmstrip on said spool spaced opposite said relieved annular portion, said sensing means includes a sensing member normally positioned in abutment against said relieved annular portion and movable away from the relieved annular portion by riding on the longitudinal section of the first convolution of the filmstrip, and said engaging means includes an engaging member connected with said sensing member for movement to engage said counter as the sensing member is moved away from said relieved annular portion.

5. An improved photographic camera of the type wherein (a) a sprocket having teeth engagable with successive perforations in a filmstrip is rotated by movement of the filmstrip from a film cartridge onto a take-up spool and back into the cartridge, (b) a frame counter responsive to rotation of said sprocket is rotated from an empty setting to provide a count of the number of frames exposed or remaining on the filmstrip, (c) a door is openable to load and remove the cartridge into and from said camera, and (d) initializing means responsive to the opening of said door rotates said counter back to its empty· setting, and wherein the improvement comprises:

a sensing member normally positioned in abutment against said take-up spool for sensing the presence of at least one convolution of a filmstrip on the spool;

means movable for engaging said counter to prevent the counter from being rotated by said initializing means, though permitting said counter to be rotated by said sprocket; and means supporting said sensing member for movement responsive to the presence of at least one convolution of a filmstrip on said take-up spool for moving said engaging member to engage said counter, whereby said initializing means will be rendered ineffective in the event said door is opened with at least one convolution of the filmstrip on said take-up spool.

6. The improvement as recited in claim 5, wherein said counter includes a rotatable disk for indicating the frame count and a rotatable motion-transmitting member normally coupling said disk and said sprocket, said motion-transmitting member being supported for movement responsive to the opening of said door to uncouple the disk and the sprocket.

* * * * *